(12) United States Patent
Moro et al.

(10) Patent No.: US 6,294,748 B1
(45) Date of Patent: Sep. 25, 2001

(54) WIRE ELECTRICAL DISCHARGE MACHINE

(75) Inventors: Toshio Moro; Seiji Satou, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/462,161

(22) PCT Filed: May 28, 1998

(86) PCT No.: PCT/JP98/02362

§ 371 Date: Jan. 5, 2000

§ 102(e) Date: Jan. 5, 2000

(87) PCT Pub. No.: WO99/61190

PCT Pub. Date: Dec. 2, 1999

(51) Int. Cl.[7] .............................. B23H 1/00; B23H 7/10
(52) U.S. Cl. ...................................... 219/69.12; 219/69.14
(58) Field of Search ............................... 219/69.12, 69.14

(56) References Cited

U.S. PATENT DOCUMENTS

| | | | |
|---|---|---|---|
| 6,150,626 | * 11/2000 | Moro et al. | 219/69.12 |
| 6,229,110 | * 5/2001 | Hosaka et al. | 219/69.12 |

FOREIGN PATENT DOCUMENTS

| | | | |
|---|---|---|---|
| 2233924 | * 1/1991 | (GB) | 219/69.12 |
| 62-271630 | * 11/1987 | (JP) | 219/69.14 |
| 63-318217 | 12/1988 | (JP) . | |
| 63-318216 | * 12/1988 | (JP) | 219/69.14 |
| 63-318218 | * 12/1988 | (JP) | 219/69.14 |
| 1-164521 | 6/1989 | (JP) . | |
| 2-48119 | * 2/1990 | (JP) | 219/69.12 |
| 4-30913 | * 2/1992 | (JP) | 219/69.14 |

OTHER PUBLICATIONS

International Search Report of PCT/JP98/02362.

* cited by examiner

Primary Examiner—Geoffrey S. Evans
(74) Attorney, Agent, or Firm—Sughrue, Mion, Zinn, Macpeak & Seas, PLLC

(57) ABSTRACT

A wire electrical discharge machine having an upper wire guide and a lower wire guide through which a wire electrode is passed and which have therein channels for the working fluid to flow therethrough, including: ajet nozzle which is engaged with and fixed to an outer peripheral surface of a distal end portion of the upper wire guide, and is adapted to guide the wire electrode to a hole in the lower wire guide through use of the fluid; a working fluid nozzle for covering the jet nozzle and having a through hole in a central portion thereof and a collar portion in a periphery thereof; a retaining plate for fixing an outer peripheral portion of the working fluid nozzle including the collar portion, and the retaining plate having a channel for supplying and discharging the fluid; and a sealed space portion which is disposed between the collar portion of the working fluid nozzle and the retaining plate and expands and contracts due to the fluid which flows in or out through the channel.

3 Claims, 8 Drawing Sheets

WIRE ELECTRICAL DISCHARGE MACHINE

TECHNICAL FIELD

The present invention relates to improvements on a wire electrical discharge machine so as to allow a water-column generating nozzle for guiding a wire electrode by means of a fluid to be realized by a simple mechanism having a small fluid loss.

BACKGROUND ART

A conventional wire electrical discharge machine will be described with reference to FIGS. 8 and 9. In FIGS. 8 and 9, the wire electrical discharge machine is comprised of a bed 1 serving as a base; a table 5 for fixing a workpiece 3 which is processed by a wire electrode 2; a processing tank 7 in which a working fluid is stored; an X-axis driving section 13 for moving the table 5 in an X-axis direction by moving an X-axis table 9 by driving an X-axis motor 8; a Y-axis driving section 17 for moving the table 5 in a Y-axis direction by causing a column 19 to move along a longitudinal direction of a lower arm 20 fixed to the base 1, by driving a Y-axis motor 15; a Z-axis driving section 21 for moving the table 5 in a Z-axis direction and fixed to a column 19; a lower wire guide 25 fixed to the lower arm 20 via an insulating plate on a vertical surface of a distal end of the lower arm 20; an upper wire guide 30 fixed to a distal end portion of the Z-axis driving section 21 so as to guide the wire electrode 2; an electric supply section 60 incorporated in the upper wire guide 30 so as to supply electricity to the wire electrode 2; and a feeding/collecting section for feeding and collecting the wire electrode 2.

The upper wire guide 30 allows the working fluid to flow to the workpiece 3 while guiding the wire electrode 2, and is arranged such that an upper end portion of a guide body portion 33 having a collar is engaged with and fixed to a guide attaching plate 31 which has a channel for supplying the working fluid to the workpiece 3 and a guide hole for passing the wire electrode 2 through. A hollow cylindrical portion for guiding the wire electrode 2 is provided in the guide body portion 33. As a central hole of a rectifying plate 35 having a plurality of holes 35a for the working fluid to flow therethrough is engaged with and fixed to this cylindrical portion, a pool 36 is formed between a channel outlet of the guide attaching plate 31 and the holes 35a of the rectifying plate 35.

A lower auxiliary guide 38 for guiding the wire electrode 2 is fixed in the interior of a lower portion of the guide body portion 33, and an upper auxiliary guide 39 is also fixed in the interior of an auxiliary plate 37 fixed to an upper portion of the guide attaching plate 31. It should be noted that the guide attaching plate 31 and the auxiliary plate 39 are fixed to an upper block 41.

A jet nozzle 40 for guiding the wire electrode 2 into a guide hole in the lower wire guide 25 by means of the fluid has its outer peripheral surface fixed to an inner peripheral surface of the rectifying plate 35, and has a collar whose top surface is fixed to a holding portion 35b of the rectifying plate 35 via a spring 45, the jet nozzle 40 and the like being covered with a working fluid nozzle 47. The arrangement provided is such that the tip of the jet nozzle 40 returns to avoid contact with the workpiece 3 as the spring 45 is compressed by the pressure of the fluid to lower the tip of the jet nozzle 40 and stop the supply of the working fluid. It should be noted that a pipe 50 for the jet nozzle 40 and a pipe 55 for the working fluid nozzle 47 are connected to inlet ports of the guide attaching plate 31. In addition, since the basic configuration of the lower wire guide is identical to that of the upper wire guide, a description thereof will be omitted.

The electric supply section 60 is comprised of an electric supply die 62 for supplying electricity to the wire electrode 2 and a die holding plate 64 for fixing this electric supply die 62, the electric supply die 62 being electrically connected to an unillustrated power source.

The feeding/collecting section is arranged such that the wire electrode 2 passes through a pipe 89 and is accommodated in a collecting box 90 by means of rollers 83, 85, and 87 for changing the direction of the wire electrode 2 wound around a wire bobbin 80.

Referring to FIGS. 8 and 9, a description will be given of the operation of the wire electrical discharge machine having the above-described construction. First, when the working fluid is supplied to the pipe 50, the jet nozzle 40 moves downward under the pressure of the working fluid while pressing the spring 45, and a jet stream jets out from a jetting hole 40a of the jet nozzle 40, which in turn causes the wire electrode 2 to pass through the interior of this jet stream and guides the wire electrode 2 to the lower wire guide 25, connecting the wire electrode 2 thereto.

During processing, the working fluid from the pipe 50 is stopped, which in turn causes the jet nozzle 40 to return upward by means of the spring 45, and the working fluid from the pipe 55 passes through the channel inside the guide attaching plate 31, the curving and the like of the fluid due to the occurrence of turbulence being alleviated by means of the pool 36. The working fluid then passes through the holes 35a in the rectifying plate 35 for stabilizing the direction in which the working fluid jets out from a jetting hole 47a of the working fluid nozzle 47, and the working fluid jets out from the jetting hole 47a.

Meanwhile, the wire electrode 2 is energized by the unillustrated power source through the electric supply die 62, and while electrical discharge between the workpiece 3 and the wire electrode 2 is continued and the table 5 is being moved along the X-, Y-, and Z-axes by moving the X-axis driving section 17, the Y-axis driving section 19, and the Z-axis driving section 21, the high-speed working fluid from the working fluid nozzle 47 is supplied to a gap between the workpiece 3 and the working fluid nozzle 47 (hereafter referred to as the gap between the electrodes), thereby discharging and removing the processing sludge produced in the gap between the electrodes. While electrical discharge is continued in a state in which a proper gap is maintained between the electrodes and the resistance value is maintained to a fixed value, processing is continued.

However, with the electrical discharge machine having the above-described construction, since the jet nozzle 40 undergoes the extending and retracting operation separately and independently of the working fluid nozzle 47, the extending/retracting mechanism is complex, and since the jet nozzle 40 is lowered by the fluid against the reaction force of the spring 45, there has been a problem in that the fluid loss is large.

Further, after the working fluid passes through the channel in the guide attaching plate 31 from the pipe 55, and temporarily stays in the pool 36 with its pressure thereby increased, the working fluid passes through the holes 35a in the rectifying plate 35 and undergoes conversion to velocity energy, then stays in a space portion formed by the rectifying plate 35 and the inner surface of the working fluid nozzle 47 and is converted to pressure energy. The high-speed fluid is then jetted out from the jetting hole 47a in the working fluid nozzle 47 to the gap between the electrodes as the velocity energy.

Namely, since the form of energy of the working fluid undergoes four conversions in terms of both the velocity and pressure, the retained energy of the working fluid is gradually lost at the inlet of the guide attaching plate 31, causing a decline in the velocity energy when the working fluid jets out from the jetting hole 47a of the working fluid nozzle 47. Accordingly, there has been a problem in that, particularly when the gap between the electrodes has become wide apart, the pressure of the working fluid drops, and the disturbance in the jetting direction changes substantially, so that the processing becomes unstable.

In addition, although the rectifying plate 35 alleviates the curving and deflection of the fluid caused by the occurrence of turbulence of the working fluid inside the pool 36, and allows the working fluid to jet out after straightly upwardly stabilizing the directionality of the working fluid jetting out from the jetting hole 47a in the working fluid nozzle 47, there has been a problem in that a large pressure loss is produced.

DISCLOSURE OF THE INVENTION

The present invention has been devised to overcome the above-described problems, and its object is to provide an electrical discharge machine in which the pressure loss is small in jetting out the working fluid from the nozzle.

To attain this object, in accordance with a first aspect of the invention, there is provided a wire electrical discharge machine including a wire electrode for processing a workpiece while causing electrical discharge to take place with a working fluid interposed between the wire electrode and the workpiece, and an upper wire guide and a lower wire guide through which the wire electrode is passed and which have therein channels for the working fluid to flow therethrough, characterized by comprising: a water-column generating nozzle which is engaged with and fixed to an outer peripheral surface of a distal end portion of the upper wire guide section, and is adapted to guide the wire electrode to a hole in the lower wire guide by means of the fluid; a working fluid nozzle for covering the water-column generating nozzle and having a through hole in a central portion thereof and a collar portion in a periphery thereof; a working-fluid nozzle attaching portion for fixing an outer peripheral portion of the working fluid nozzle including the collar portion, and the working-fluid nozzle attaching portion having a channel for supplying and discharging the fluid; and a sealed space portion which is disposed between the collar portion of the working fluid nozzle and the working-fluid nozzle attaching portion and expands and contracts by means of the fluid which flows in or out through the channel.

In the wire electrical discharge machine in accordance with a second aspect of the invention, the upper wire guide includes: a guide body portion which allows the wire electrode to be passed through the working fluid nozzle and has a first working fluid channel for allowing the working fluid to flow therethrough; and a guide attaching portion having a second working fluid channel for changing a direction of the working fluid which has flown into the first working fluid channel, the guide attaching portion fixing the guide body portion.

In the wire electrical discharge machine in accordance with a third aspect of the invention, a pool portion for retaining the working fluid is provided in a connecting portion between the first working fluid channel and the second working fluid channel.

BRIEF DESCRIPTION OF THE DRAWINGS

FIG. 1 is a cross-sectional view of an upper wire guide in accordance with an embodiment of the present invention, in which

BEST MODE FOR CARRYING OUT THE INVENTION

Next, a description will be given hereafter of an embodiment of the present invention.

First Embodiment

Figure 1A:
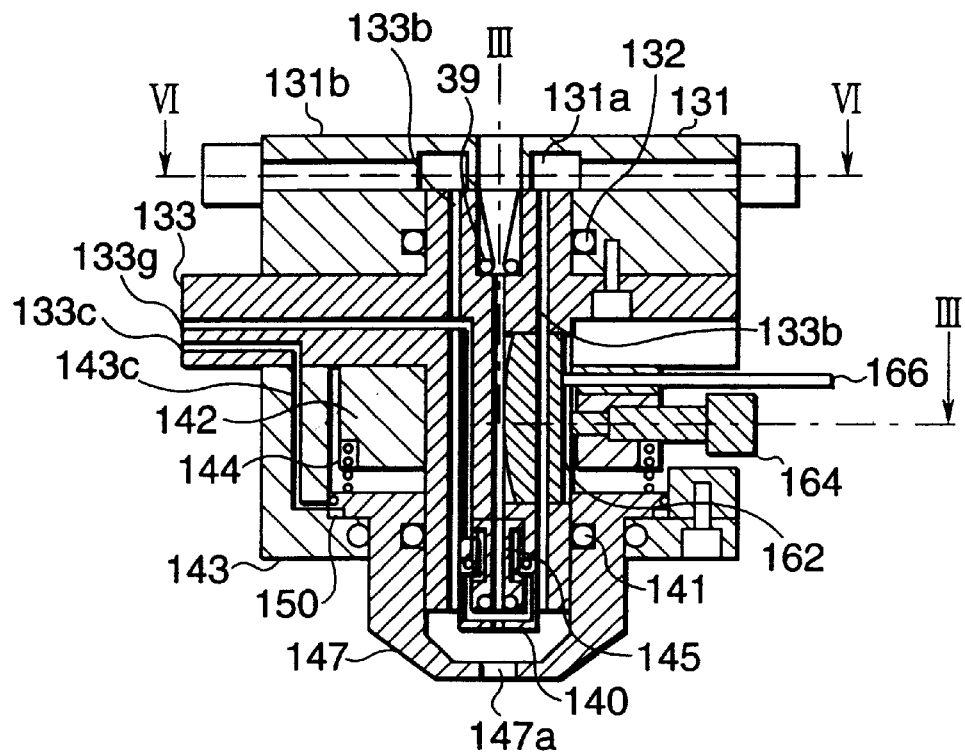
FIG. 1(a) illustrates a state in which the upper wire guide is lowered.
Figure 1B:
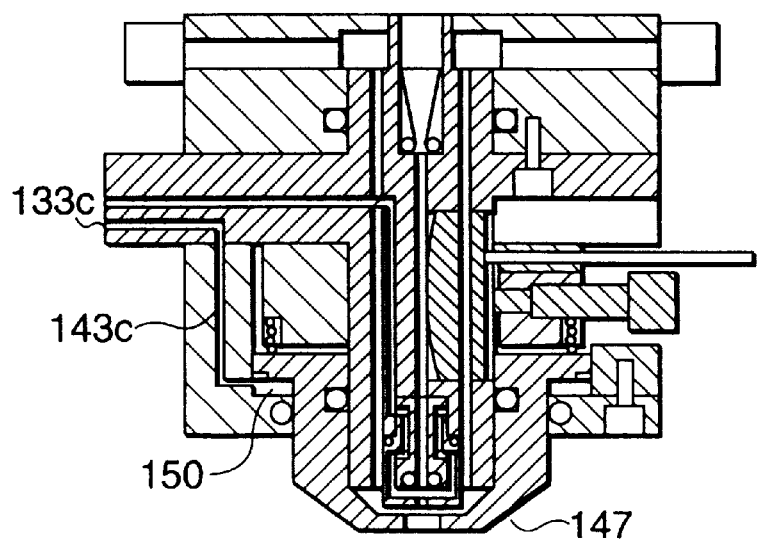
FIG. 1(b) illustrates a state in which the upper wire guide is raised.
Figure 2:
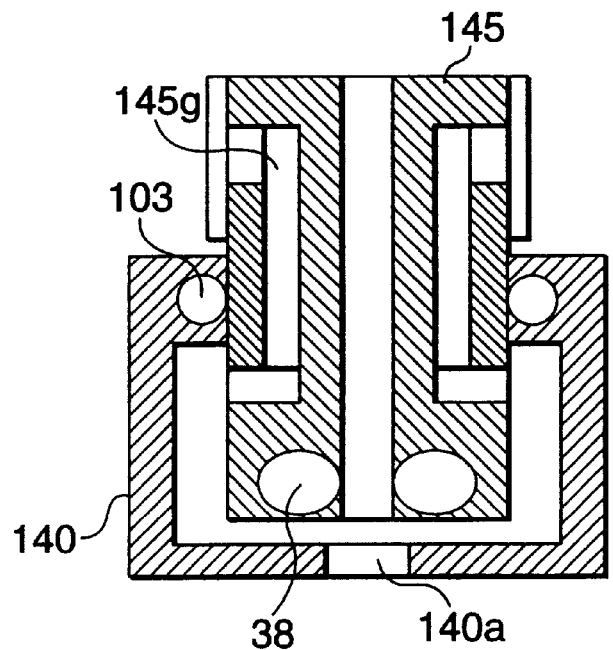
FIG. 2 is a cross-sectional view of a jet nozzle shown in FIG. 1.
Figure 3:
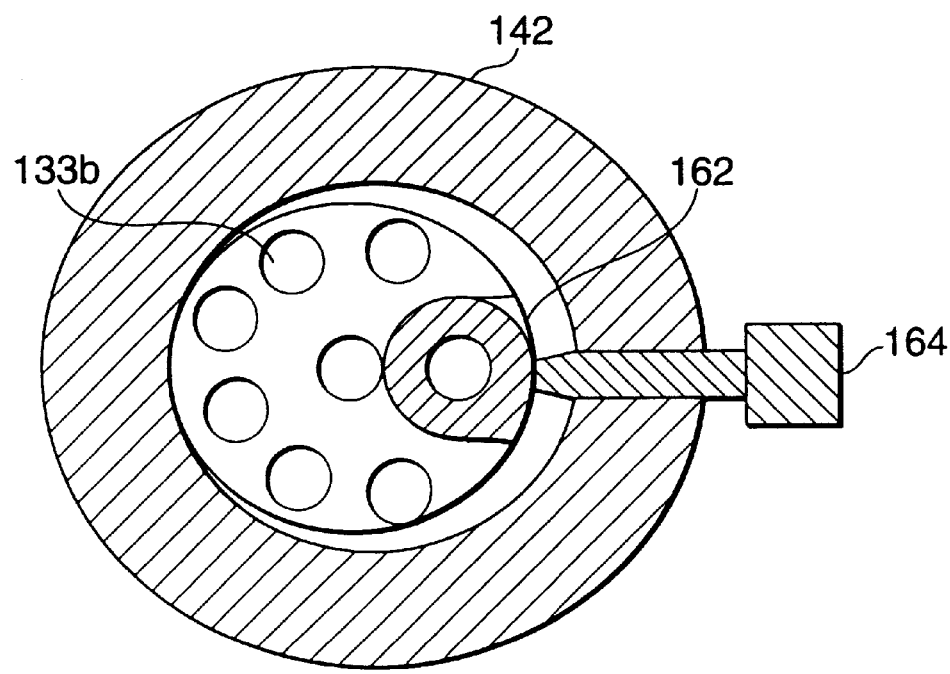
FIG. 3 is a cross-sectional view, taken along line III—III in the direction of the arrow, of an electric supply die and a guide body portion shown in FIG. 1.
Figure 4A:
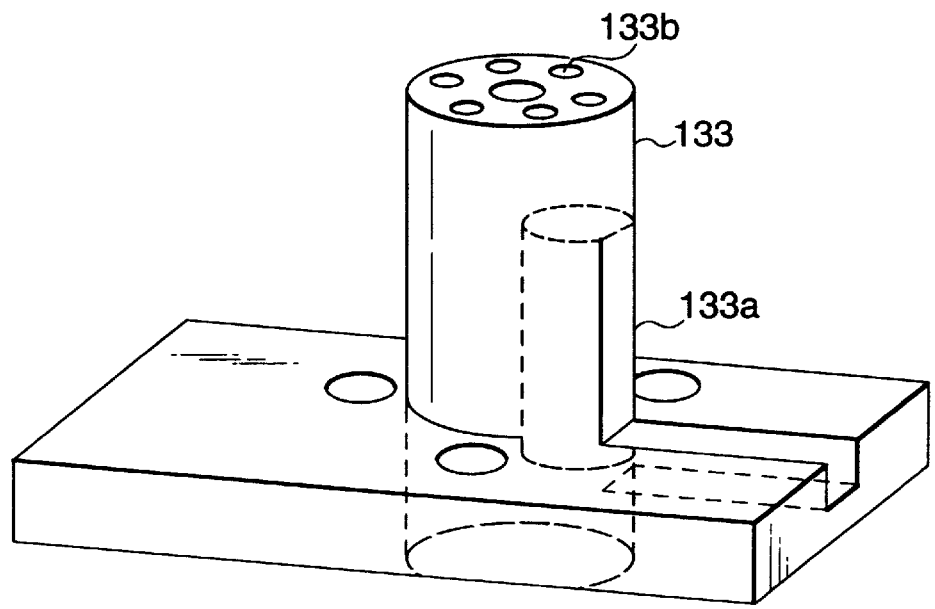
FIGS. 4(a) and 4(b) are a perspective view and a cross-sectional view, respectively, of the guide body portion shown in FIG. 1.
Figure 4B:
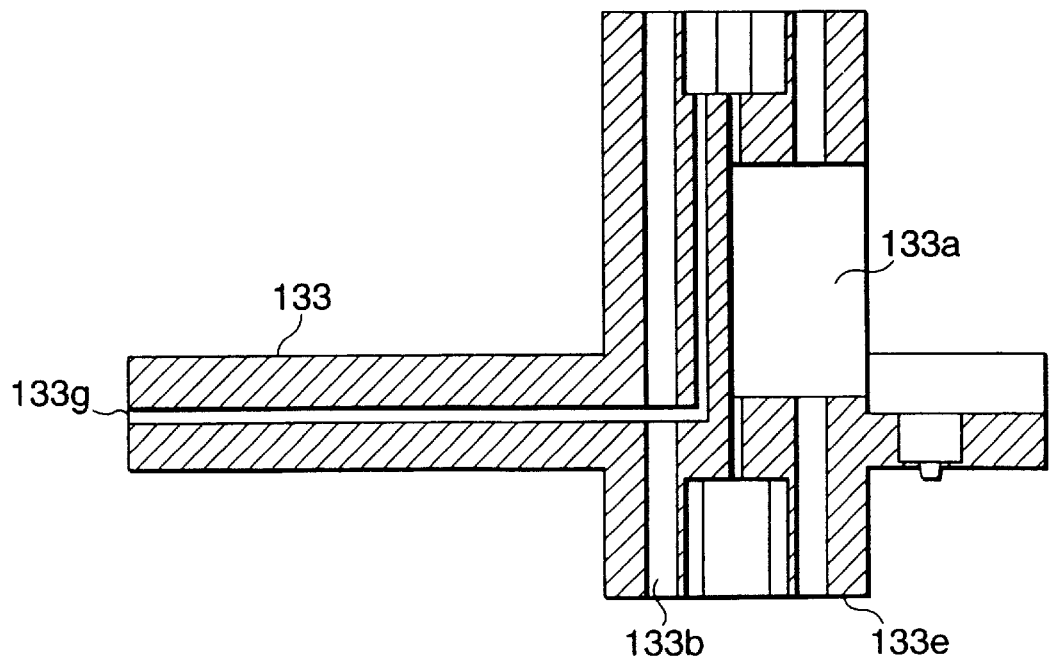
Figure 5:
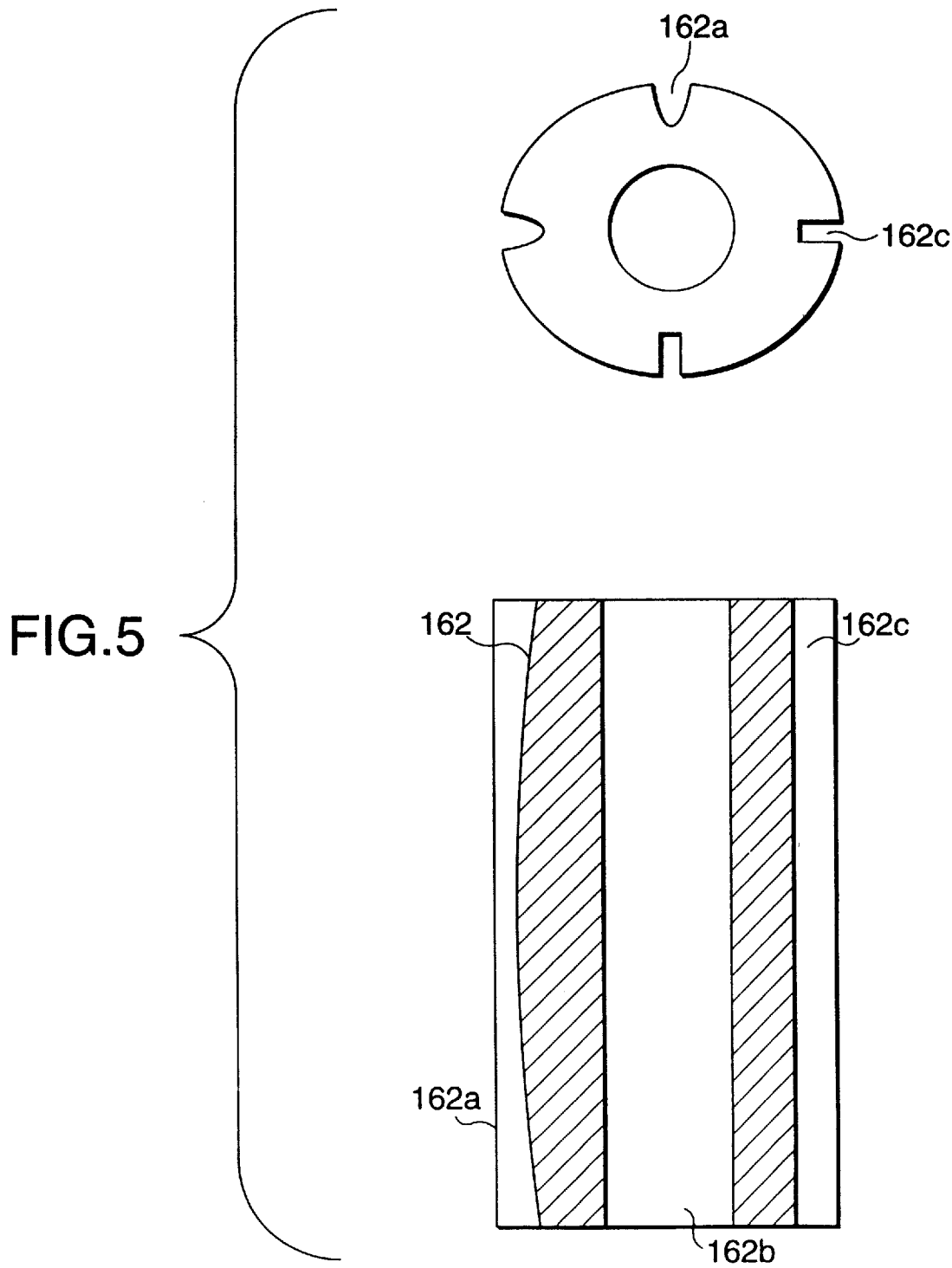
FIG. 5 is a plan and a cross-sectional view of the electric supply die shown in FIG. 1.
Figure 6:
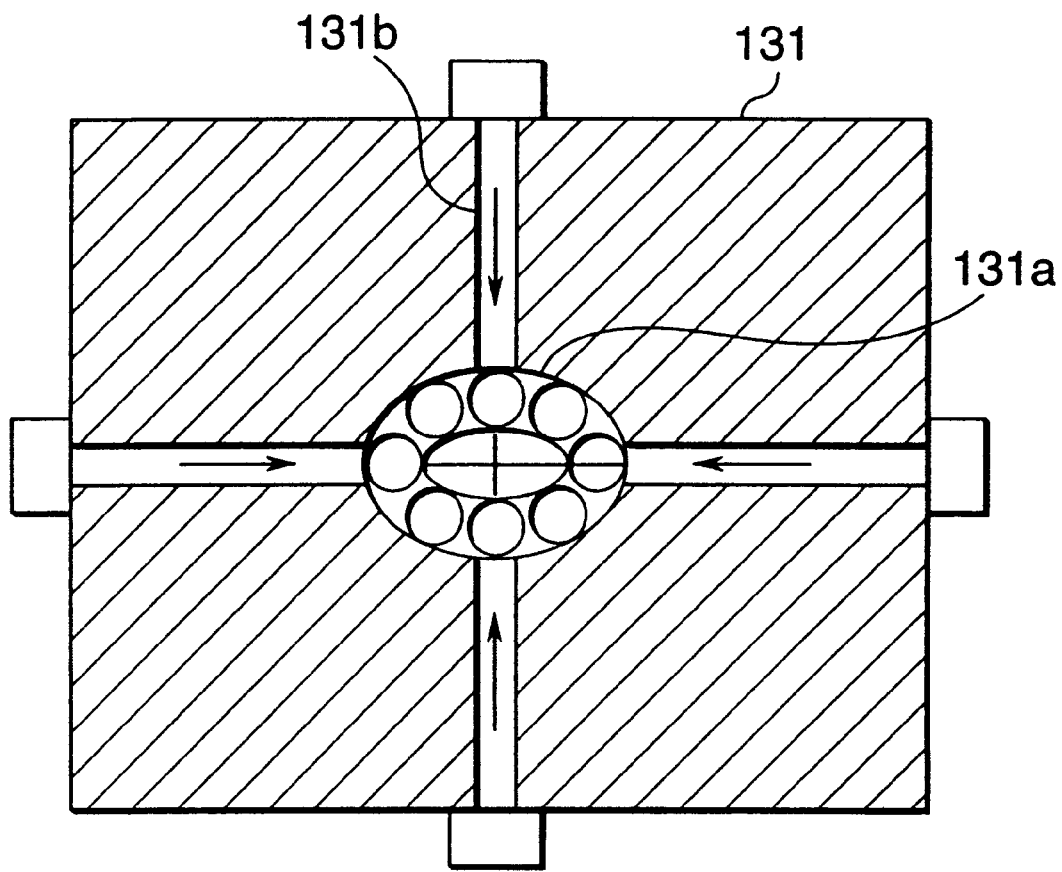
FIG. 6 is a cross-sectional view taken along line IV—IV of FIG. 1.
Figure 7:
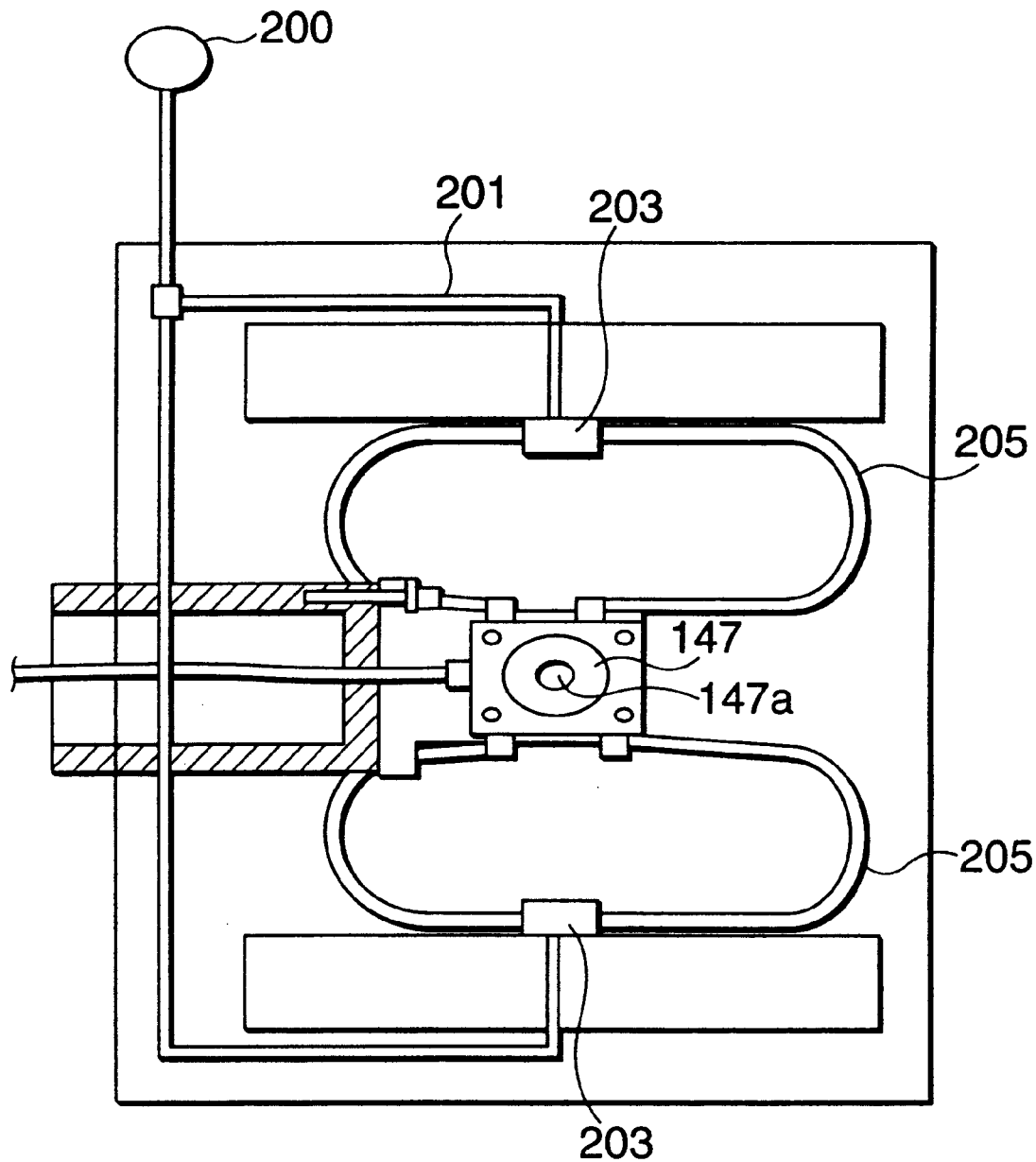
FIG. 7 is a plan view of the upper wire guide shown in FIG. 1.
Figure 8:
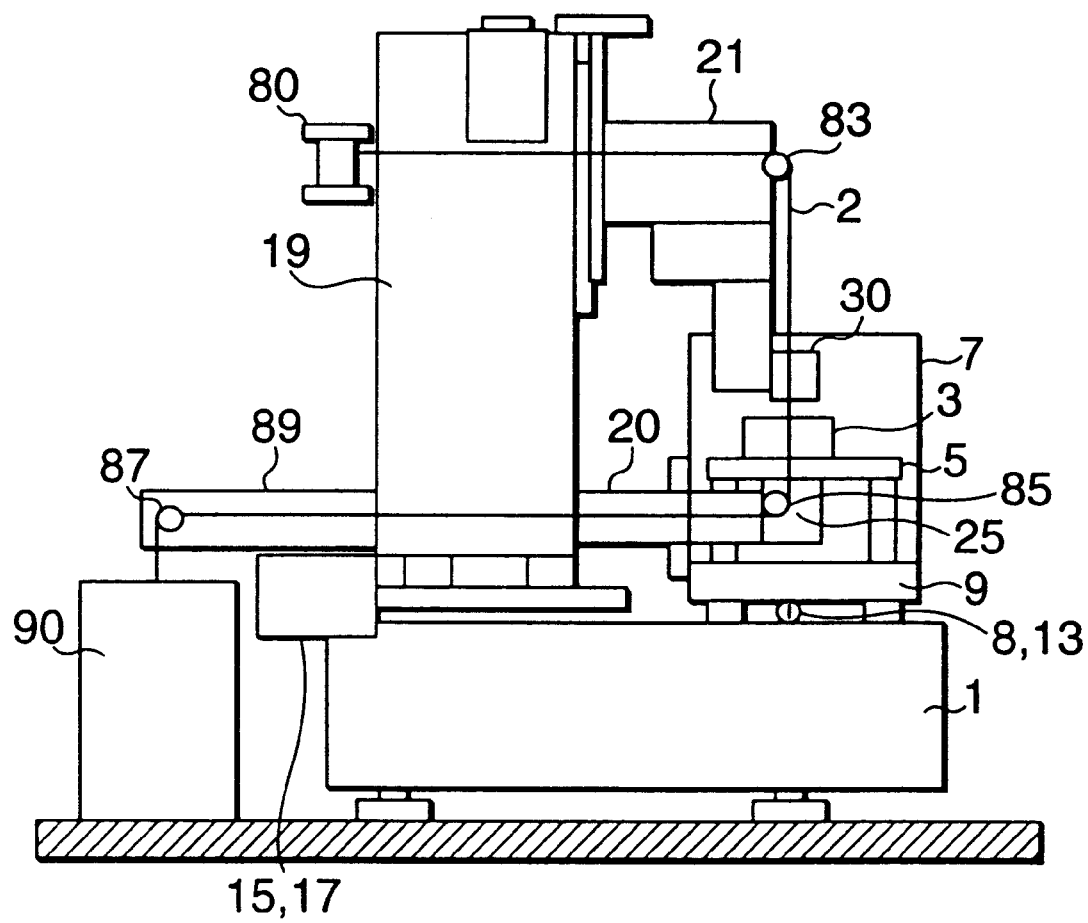
FIG. 8 is a side elevational view of a wire electrical discharge machine.
Figure 9:
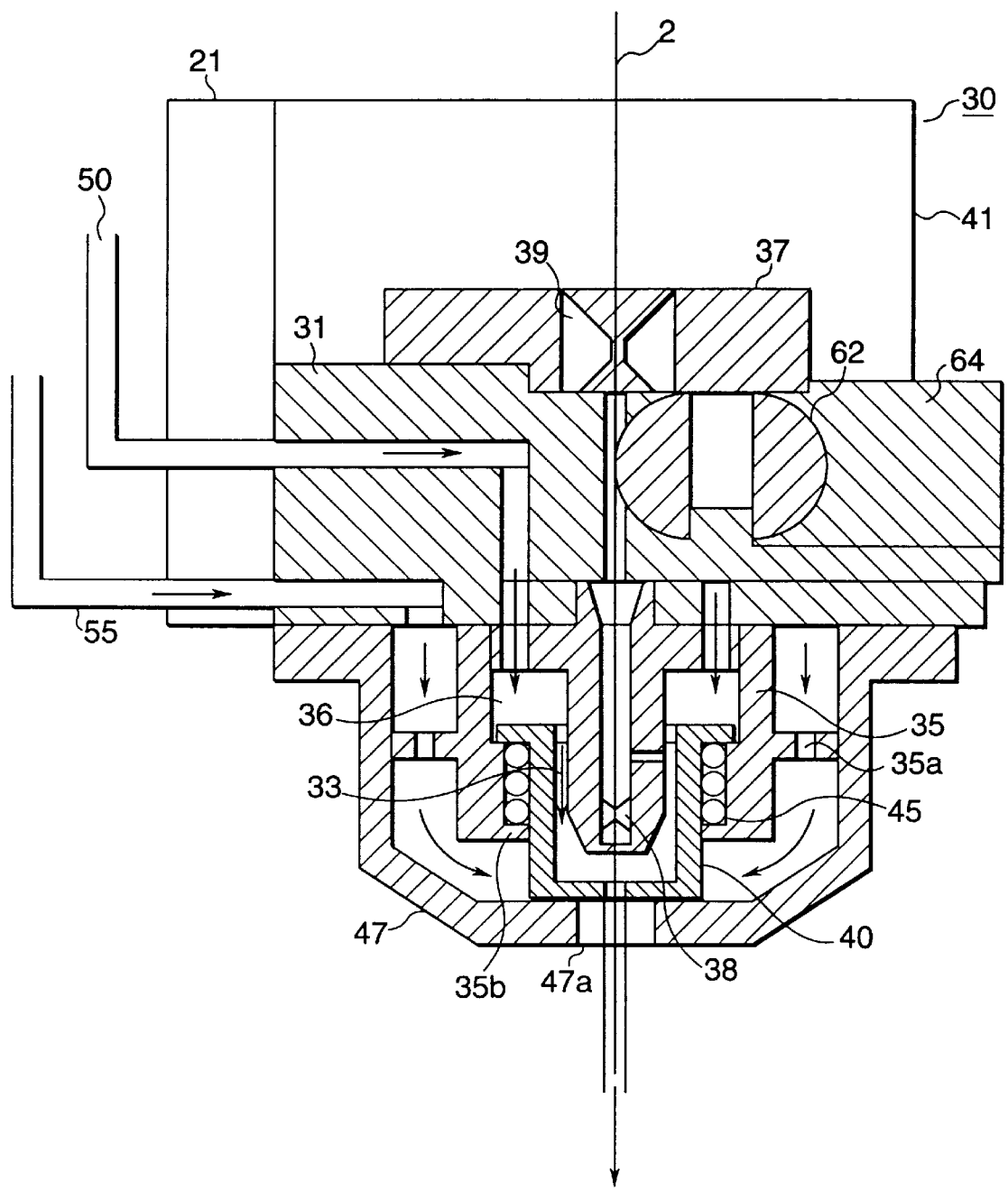
FIG. 9 is a cross-sectional view of a conventional upper wire guide.

Referring to FIGS. 1 to 7, a description will be given of an embodiment of the present invention. FIG. 1 is a cross-sectional view of an upper wire guide; FIG. 2 is a cross-sectional view of a jet nozzle shown in FIG. 1; FIG. 3 is a cross-sectional view, taken along line III—III in the direction of the arrow, of an electric supply die and a guide body portion shown in FIG. 1; FIG. 4 is a perspective view and a cross-sectional view of the guide body portion shown in FIG. 1; FIG. 5 is a plan and a cross-sectional view of the electric supply die shown in FIG. 1; FIG. 6 is a cross-sectional view taken along line IV—IV of FIG. 1; and FIG. 7 is a plan view of the upper wire guide shown in FIG. 1.

In FIGS. 1 to 7, the upper wire guide is formed by a guide body portion 133 for jetting a working fluid to a workpiece 3 while guiding a wire electrode 2 into a hole formed in its central portion; a substantially cylindrical electric supply die 162 which is engaged in a notched portion 133a of this guide body portion 133; a doughnut-shaped ring 142 which is fixed by a bolt 164 such that this electrical supply die 162 movably engages on the outer side of the guide body portion 133, and that it is difficult for an external force to be applied to the guide body portion 133; an auxiliary guide portion 145 engaged with an inner peripheral surface of a recessed portion of the guide body portion 133 by means of an O-ring; a jet nozzle 140 serving as a water-column generating nozzle which is engaged on an outer peripheral surface of this auxiliary guide portion 145 and is engaged with an inner peripheral surface of the guide body portion 133; and a working fluid nozzle 147 which is covered over this jet nozzle 140.

As shown in FIG. 4, the guide body portion 133 has linear first working fluid channels 133b for the working fluid to flow therethrough, a channel 133c for the fluid serving as a driving source for raising and lowering the working fluid nozzle 147, and a substantially L-shaped jet channel 113g for allowing the working fluid to flow to the jet nozzle 140.

A wire auxiliary guide 39 is fixed in an cylindrical recessed portion of an upper portion of the guide body portion 133, and a projecting portion 133e is engaged and fixed in a recessed portion of a guide attaching plate 131 by means of an O-ring 132.

As shown in FIG. 2, working fluid channels 145b through which the working fluid flows are formed in the auxiliary guide 145, and these working fluid channels 145b are connected to the working fluid channels 133b of the guide body portion 133, an auxiliary wire guide 38 being fixed to a distal end portion of the auxiliary guide 145. An inner peripheral surface of the set nozzle 140 having a hole 140a in its central portion is fixed to the outer peripheral surface of the auxiliary guide portion 145 by means of an O-ring 103.

As shown in FIG. 6, provided inside the guide attaching plate 131 fixed to an upper block 41 are a pool 131a for allowing the working fluid to temporarily stay therein and working fluid channels 131b formed in a cruciform from four directions at pipes 205 for allowing the working fluid to flow therethrough, and terminating portions of the working fluid channels 131b are connected to the channels 133b. This arrangement is provided so that, by allowing the working fluid to flow to the plurality of working fluid channels 131b, the flow rate of the working fluid is lowered, and an unnecessary pressure loss is suppressed. It should be noted that the pipes 205 are connected such that the fluid supplied from a pump 200 flows thereto via relay blocks 203 through pipes 201.

As shown in FIG. 5, the electric supply die 162 has a plurality of groove-shaped electric supply portions 162a provided in its periphery for supplying electricity while coming into contact with the wire electrode 2, and the electric supply die 162 also has a working fluid channel 162b formed in its central portion and connected to the working fluid channel 133b of the guide body portion 133. Rotating grooves 162c are respectively provided on opposite sides of the electric supply portions 162a to rotate the electric supply die 162 from the outside by means of a lever 166.

The working fluid nozzle 147 is formed in such a manner as to be constantly capable of being lifted upward as its collar portion, in which a spring 144 loaded at an upper surface of the ring 142 is engaged in its recessed portion, is retained by a retaining plate 143 serving as a working-fluid nozzle attaching portion. The bottom surface of the retaining plate 143 is fixed to a top surface of the guide body portion 133. The arrangement provided is such that, as the fluid flows through a channel 143c into or out of a sealed space portion 150, i.e., a gap between the retaining plate 143 and the guide body portion 133, the space portion 150 is expanded or contracted to raise or lower the working fluid nozzle 147.

Referring to FIGS. 1 to 8, a description will be given of the wire electrical discharge machine having the above-described construction. First, in the state of FIG. 1(a) in which the working fluid nozzle 147 and the jet nozzle 140 have been lowered by contracting the space portion 150 by discharging the fluid in the space portion 150 of an upper wire guide section 30, if the working fluid is supplied to the jet channel 133g, the working fluid flows to a jet channel 145g of the auxiliary guide portion 145, and a jet stream jets out from a jetting hole. 147a of the jet nozzle 147 through the gap between a distal end portion of the auxiliary guide portion 145 and the jet nozzle 147. The wire electrode 2 passes through the interior of this jet stream, and the wire electrode 2 is hence guided to a lower wire guide 25 and is connected thereto.

After completion of such a connection, the supply of the working fluid to the jet channel 133g is stopped, the fluid is allowed to flow through the channel 143c in the retaining plate 143 through the channel 133c in the guide body portion 133, and the fluid is supplied to the space portion 150 to expand the same, thereby raising (retracting) the working fluid nozzle 147. The operation then proceeds to processing.

At the time of processing, the working fluid passes through the pipes 201 from the pump 200, passes through the pipes 205 through the relay blocks 203, passes through the cruciform channels 131b in the guide attaching plate 131, and after temporarily staying in the pool 131a, the working fluid passes through the channels 133b in the guide body portion 133 and the channel 162b in the electric supply die. The working fluid is then supplied from the jetting hole 147a of the working fluid nozzle 147 to the gap between the electrodes at high speed, thereby discharging and removing the processing sludge. Processing is continued while electrical discharge is continued in the state in which a proper gap is maintained between the electrodes and the resistance value is maintained to a fixed value.

At the same time, the workpiece 3 is processed to a desired shape while electrical discharge is allowed to take place between the workpiece 3 and the wire electrode 2 by energizing the wire electrode 2 by the power supply through the electric supply die 162, and while a table 5 is being moved in the X-, Y-, and Z-axes by operating an X-axis driving section 17, a Y-axis driving section 19, and a Z-axis driving section 21.

As described above, in accordance with the first aspect of the invention, the following are provided: the water-column generating nozzle which is engaged with and fixed to the outer peripheral surface of the distal end portion of the upper wire guide section, and is adapted to guide the wire electrode to the hole in the lower wire guide by means of the fluid; the working fluid nozzle for covering the water-column generating nozzle and having the through hole in a central portion thereof and the collar portion in a periphery thereof; the working-fluid nozzle attaching portion for fixing an outer peripheral portion of the working fluid nozzle including the collar portion, and the working-fluid nozzle attaching portion having a channel for supplying and discharging the fluid; and the sealed space portion which is disposed between the collar portion of the working fluid nozzle and the working-fluid nozzle attaching portion and expands and contracts by means of the fluid which flows in or out through the channel. Accordingly, there is an advantage in that the working fluid nozzle and the water-column generating nozzle can be raised and lowered simultaneously by a simple mechanism.

In accordance with the second aspect of the invention, the upper wire guide includes: the guide body portion which allows the wire electrode to be passed through the working fluid nozzle and has the first working fluid channel for allowing the working fluid to flow therethrough; and the guide attaching portion having the second working fluid channel for changing the direction of the working fluid which has flown into the first working fluid channel, the guide attaching portion fixing the guide body portion. Therefore, in addition to the advantage of the first aspect of the invention, there is an advantage in that the pressure loss of the working fluid in the first channel and the second channel can be lowered, and the velocity energy of the working fluid jetting out from the working fluid nozzle is difficult to drop.

In accordance with the third aspect of the invention, the pool portion for retaining the working fluid is provided in the connecting portion between the first working fluid channel and the second working fluid channel. Therefore, in addition to the advantages of the second aspect of the invention, there is an advantage in that it is easy to jet the working fluid from the working fluid nozzle in a straight manner.

Industrial Applicabilty

As described above, the wire electrical discharge machine in accordance with the present invention is suitable for easily supplying the working fluid to the jet nozzle.

What is claimed is:

1. A wire electrical discharge machine including a wire electrode for processing a workpiece while causing electrical discharge to take place with a working fluid interposed between said wire electrode and said workpiece, and an upper wire guide and a lower wire guide through which said wire electrode is passed and which have therein channels for the working fluid to flow therethrough, comprising: a water-column generating nozzle which is engaged with and fixed to an outer peripheral surface of a distal end portion of said upper wire guide, and is adapted to guide said wire electrode to a hole in said lower wire guide by means of the fluid;

a working fluid nozzle for covering said water-column generating nozzle and having a through hole in a central portion thereof and a collar portion in a periphery thereof;

a working-fluid nozzle attaching portion for fixing an outer peripheral portion of said working fluid nozzle including said collar portion, and said working-fluid nozzle attaching portion having a channel for supplying and discharging the fluid; and a sealed space portion which is disposed between said collar portion of said working fluid nozzle and said working-fluid nozzle attaching portion and which expands and contracts by means of the fluid which flows in or out through said channel.

2. The wire electrical discharge machine according to claim 1, wherein said upper wire guide includes:

a guide body portion which allows said wire electrode to be passed through said working fluid nozzle and has a first working fluid channel for allowing the working fluid to flow therethrough; and a guide attaching portion having a second working fluid channel for changing a direction of the working fluid which has flowed into said first working fluid channel, said guide attaching portion fixing said guide body portion.

3. The wire electrical discharge machine according to claim 2, wherein a pool portion for retaining the working fluid is provided in a connecting portion between said first working fluid channel and said second working fluid channel.

* * * * *